United States Patent
Ward et al.

(10) Patent No.: US 6,805,618 B1
(45) Date of Patent: Oct. 19, 2004

(54) WATER JET ABRASIVE RECYCLING APPARATUS AND METHOD

(75) Inventors: Vincent C. Ward, Houston, TX (US); Mark V. Ward, Houston, TX (US); Bryce D. Ward, Houston, TX (US)

(73) Assignee: Zuluboy, Inc., Kent, OH (US)

(*) Notice: Subject to any disclaimer, the term of this patent is extended or adjusted under 35 U.S.C. 154(b) by 125 days.

(21) Appl. No.: 09/936,314
(22) PCT Filed: Sep. 8, 2000
(86) PCT No.: PCT/US00/05991
§ 371 (c)(1), (2), (4) Date: Jan. 25, 2002
(87) PCT Pub. No.: WO00/53382
PCT Pub. Date: Sep. 14, 2000

Related U.S. Application Data
(60) Provisional application No. 60/123,257, filed on Mar. 8, 1999.

(51) Int. Cl.⁷ ............................................. B24C 9/00
(52) U.S. Cl. .................................... 451/87; 451/88
(58) Field of Search ....................... 451/87, 88, 75, 451/89, 38

(56) References Cited

U.S. PATENT DOCUMENTS
| | | | | |
|---|---|---|---|---|
| 5,799,643 A | * | 9/1998 | Miyata et al. | 125/21 |
| 6,328,638 B1 | * | 12/2001 | Hopkins et al. | 451/88 |
| 6,371,839 B2 | * | 4/2002 | Izawa et al. | 451/88 |

* cited by examiner

*Primary Examiner*—Eileen P. Morgan
(74) *Attorney, Agent, or Firm*—Renner, Kenner, Greive, Bobak, Taylor & Weber (57) ABSTRACT

A preferred embodiment of the present invention relates to an abrasive recovery apparatus for use in conjunction with the slurry generated by water jet cutting or conditioning operations. The generated slurry is comprised of both non-recyclable fines and recyclable particles. The abrasive recovery apparatus comprises a slurry intake system having one or more pumps which collect and distribute slurry. The abrasive recovery apparatus further comprises a vibrating separator having a filter sized and shaped such that the non-recyclable fines in the slurry are separated from the recyclable particles in the slurry. The abrasive recovery apparatus still further comprises a fluidized bed dryer having heating elements to dry the recyclable particles.

3 Claims, 9 Drawing Sheets

WATER JET ABRASIVE RECYCLING APPARATUS AND METHOD

This application claims the benefit of U.S. Provisional Application No. 60/123,257, filed Mar. 8, 1999.

FIELD OF THE INVENTION

The present invention relates to an apparatus and method to reclaim abrasives used in water jet cutting mechanisms. More specifically, the present invention relates to an apparatus and method to remove the sludge from an abrasive water jet cutting tank and recycle the abrasives for later reuse.

BACKGROUND OF THE INVENTION

Industrial cutting has long been accomplished with hydraulic jetting of abrasives against a work surface to condition or cut the surface. Surface conditioning of steel slabs, blooms, and billets has also been accomplished with abrasive water jetting. The abrasives used in these processes have historically been discarded after use or re-circulated in a slurry form to the jetting head because of the difficulty of recovery of clean, dried, and re-useable quantities of the abrasives. It is generally preferred to introduce the abrasives as a dry material at the mixing chamber of the jetting head to prevent excessive wear of the water jet head assembly.

Heretofore, attempts to recover abrasives from cutting operations required the operator to cease operations and then dump the contents of the sump used to collect the cutting slurry and settled particulate matter into settling barrels. After allowing the abrasives to settle, the water was dumped off the top of the settled grit and discarded. The bulk grit was thereafter shoveled into piles to dry. These labor intensive recovery methods were deemed uneconomic and the settled slurry consisting of abrasive particles, along with the cuttings from the process, was discarded without any attempt to recover the reusable grit. A variety of mechanical recovery mechanisms involving shaking tables or screens have been used to recover grit from the cutting slurry. These methods have proved useful, but still required extensive operator intervention to complete the recovery of reusable abrasives.

SUMMARY OF THE INVENTION

A preferred embodiment of the present invention relates to an abrasive recovery apparatus for use in conjunction with the slurry generated by water jet cutting or conditioning operations. The generated slurry is comprised of both non-recyclable fines and recyclable particles. The abrasive recovery apparatus comprises a self-clearing slurry intake system, a vibrating separator, and a fluidized bed dryer. The slurry intake system has one or more pumps which collect and move the slurry to the vibrating separator. The vibrating separator has a filter sized and shaped such that the non-recyclable fines in the slurry are separated from the recyclable particles in the slurry. A fluidized bed dryer has heating elements located to dry the recyclable particles.

Another preferred embodiment of the present invention provides an abrasive recovery apparatus for use in conjunction with the slurry generated by water jet cutting or conditioning operations. The slurry is comprised of non-recyclable fines and recyclable particles. The abrasive recovery apparatus comprises a slurry intake system, a vibrating separator, and a fluidized bed dryer. The slurry intake system is for distributing collected slurry. The slurry intake system has a sump pump, a nozzle-orifice arrangement, and a diaphragm pump. The sump pump provides continuous flow of dirty water through the nozzle and into the orifice connected to the low pressure side of the diaphragm pump. The diaphragm pump moves the slurry downstream from the sump to the vibrating separator and intermittently provides no flow through the orifice permitting the flow of dirty water from the sump pump to dislodge the abrasive grit agglomerated at the opening to the orifice.

In this preferred embodiment, the vibrating separator is downstream from the diaphragm pump for receiving the slurry, thereafter cleaning and separating the non-recyclable fines from the recyclable particles. The vibrating separator has a distributor, a shaker filter, a waste spout, a recycle spout, and a vibrator mounted on a shaker table. The distributor is a shallow pan for receiving and distributing the slurry to the shaker filter. The shaker filter has one or more screens to selectively remove non-recyclable fines from the slurry and pass them through the waste spout. The shaker filter further passes the recyclable particles through the recycle spout. To prevent the shaker filters from blinding or clogging, the shaker filter has a plurality of screen brushes which are free to move about both vertically and horizontally in the space between the filter screens to agitate the slurry and prevent clogging of the screens.

The fluidized bed dryer comprises a drying chamber, heating elements and a final product spout. Air is forced into the dryer from the plenum below the dryer through tuyeres and vents into the atmosphere. The drying chamber receives the recyclable particles from the recycle spout. Once received, the heating elements dry the recyclable particles which are passed out the final product spout which are then again selectively screened to separate recyclable grit from other undesired waste materials or other by-products of the cutting process.

Another preferred embodiment of the present invention provides a method for the recovery of dried abrasive from a water jetting operation. Slurry is received from an abrasive water jetting operation. The slurry is selectively pumped to a separator. Selected abrasive slurry particles are separated, washed and dried.

It is therefore a primary object of the present invention is to provide an automated mechanism and method of recovering cutting abrasives used in high-pressure water jet cutting mechanisms in a cleaned and dried condition.

It is a further object of the present invention is to provide a means for selectively grading and reclaiming the remaining fines or grit in a cutting slurry and diverting used or spent fines from the reusable materials for disposal.

It is another object of the present invention is to provide a environmentally safe drying operation which produces no toxic waste gases as a by-product of combustion through the use of electric heating elements.

It is yet another object of the present invention is to allow the use and recovery of a variety of abrasives having varying hardness as measured by the Mohs scale and a variety of particle sizes by easily changing the screen size of the selective washing and drying screen to segregate spent abrasives from reusable particles.

Another object of the present invention is to permit the recovery of precious and valuable metals from recyclable cutting grits thereby lowering the cost of recovery of such precious metals.

Other features, and the advantages, of the present invention will be made clear to those skilled in the art by the following detailed description of the preferred embodiments constructed in accordance with the teachings of the present invention.

DETAILED DESCRIPTION OF THE PREFERRED EMBODIMENT

In the preferred embodiment of the present invention, garnet is recovered from a water/garnet slurry resulting from the high-pressure water jet cutting process. Other industrial cutting grits or particulate matter, such as corundum, diamond dust, sand (silica), pumice, rouge, feldspar, silicon carbide, cerium oxide, ilmenite, spinel, beach sand or the like, may be readily substituted for garnet without departing from the spirit of the apparatus and method used. Other grits may be adapted to use the present invention with appropriate changes in screen sizes and pump capacities to selectively change the size of particle selected for reuse. However, for the purpose of illustration, and not limitation, the present invention will be described herein as being used to recover garnet from a water/garnet slurry.

In a preferred embodiment, garnet is used to create a slurry to be used in a high pressure nozzle to cut through materials such as wood, ceramics, plastics or metals. The impact of the particles against the surface cuts the work piece. On average, and depending upon the cutting application, approximately fifty percent (50%) of the original abrasive is recoverable for reuse. Although particle-size measurements are difficult to carry out in a reproducible manner because a uniform particle size and shape are rarely achieved in practice, a common description of particle size is by screen analysis. Standard screens or sieves are made of woven wire that provide essentially square openings. Tyler mesh numbers (W. S. Tyler Company) are a widely accepted means for describing particle size.

Fresh garnet used in water jetting operations may have a Tyler mesh size of say 35. This is equivalent to a sieve opening size of approximately 0.42 mm. Excessively worn garnet may pass through a 100 mesh (Tyler) screen which has a sieve opening of approximately 0.149 mm. Such excessively worn, small grains are disposable. Worn grains that will not pass through a 100 mesh (Tyler) screen are deemed recoverable. The difference between new or fresh garnet and excessively worn particles provides a means of segregating the grit from the slurry and recycling the reusable grit.

Typically, garnet used in cutting is fed into a reservoir and jetted against a work piece which is disposed above a sump. The sump provides a basin to catch the runoff from the cutting process, including particulate matter such as cuttings from the work piece, water and garnet particles. The sump tank which is positioned below the work table of a high pressure jetting mechanism will vary in size and shape to conform to the shape and cutting methods used in commercially available cutting tables.

Figure 1:
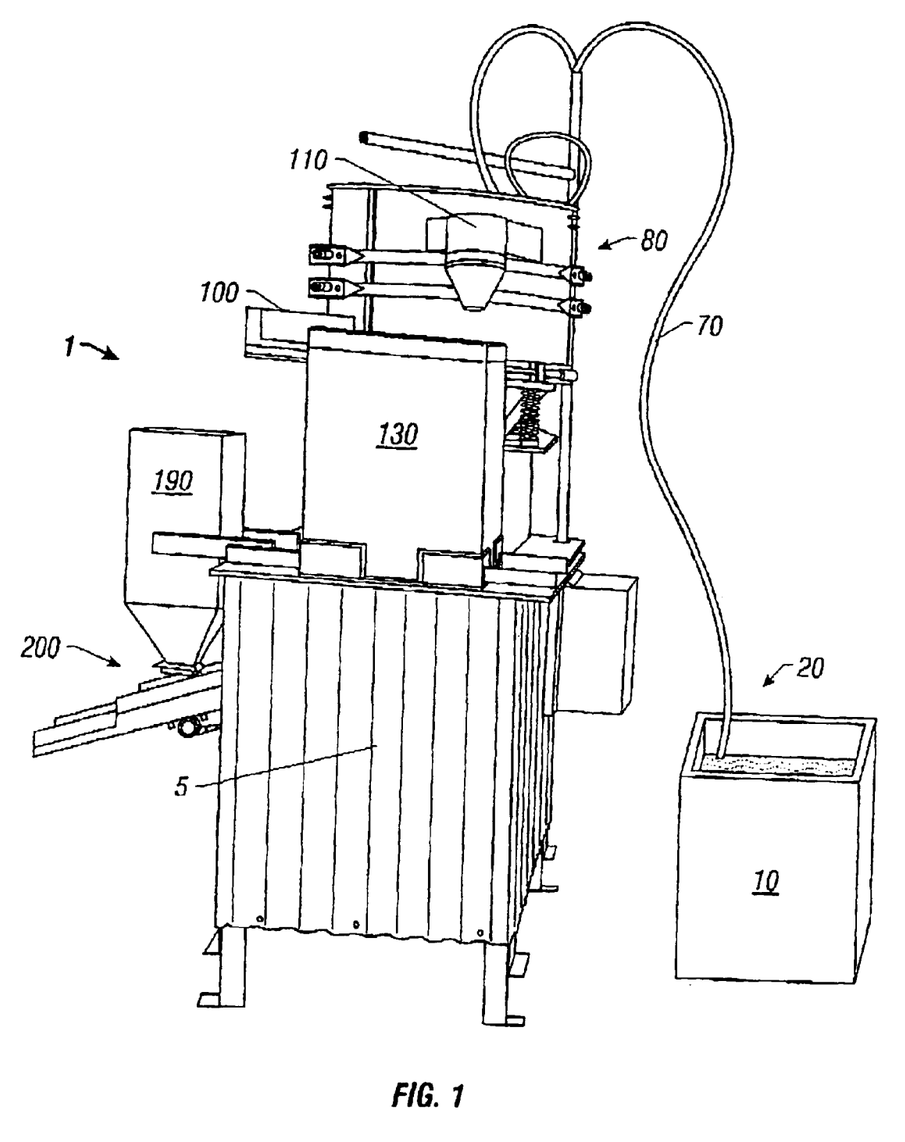
FIG. 1 is a perspective view of a preferred embodiment of the water jet recycling apparatus.

FIG. 1 illustrates a perspective view of a preferred embodiment of the water jet recycling apparatus of the present invention. The water jet recycling apparatus (indicated generally as 1) is generally comprised of a slurry intake system 20, a vibrating separator 80, a fluidized bed dryer 130, a hopper 190, an outlet spout 100, a to recycle spout 110, and a final product spout 200. All of the individual components of the water jet recycling apparatus 1 are affixed to the control chassis 5 which additionally houses the power controls. The shaker table and pump system are powered by three phase, 480 volt electrical service. Air pressure of up to 80 psi must be supplied to the system by the user.

Slurry, which has been collected in a sump 10, is pumped by the slurry intake system 20 through the slurry line 70 to the vibrating separator 80. The vibrating separator 80 passes the non-recyclable abrasives and slurry, or fines, through the outlet spout 100 into a waste tank (not shown). The wet recyclable abrasives are removed from the slurry by the vibrating separator 80 and deposited from the recycle spout 110 into the fluidized bed dryer 130. The fluidized bed dryer 130 dries the recyclable abrasives and passes them to the final product spout 200 where they are again screened to remove any remaining scrap cuttings. The remaining recycle abrasives can be mixed with fresh abrasives poured into the hopper 190.

Figure 2:
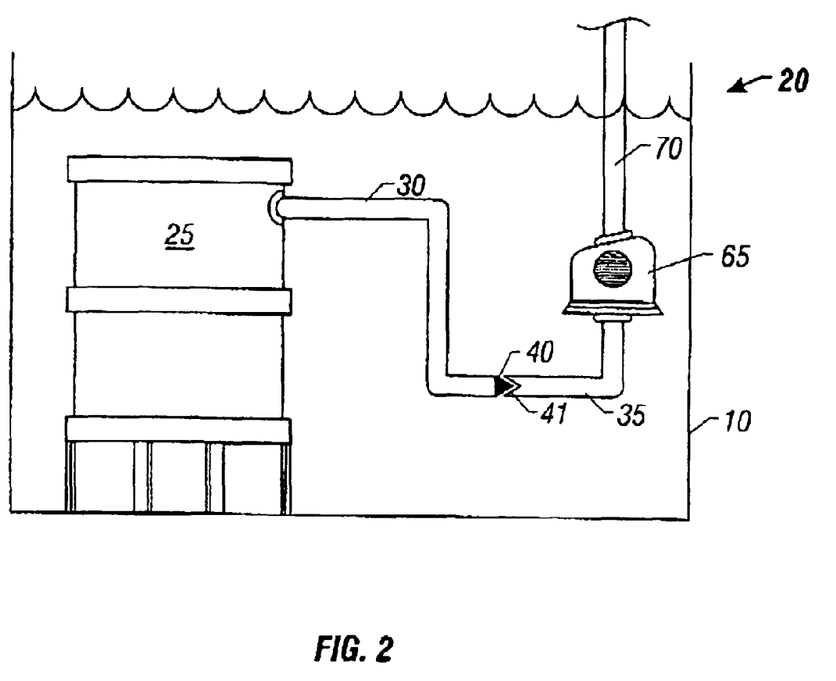
FIG. 2 is a side schematic view of a preferred embodiment of the slurry intake system acting within a sump.

FIG. 2 illustrates a schematic of the slurry intake system 20 and the sump 10. The slurry intake system 20 comprises a sump pump 25, a first line 30, a nozzle 40, an orifice 41, a second line 35, a diaphragm pump 65, and a slurry line 70. The standard sump pump, or electric jet pump, 25 is disposed in the sump 10 below the lowest fluid level of the sump tank 10 to protect it from jets from the cutting table above. The sump pump 25 provides approximately 9 gallons per minute flow of the dirty water which has separated from the slurry into the first line 30. The dirty water passes through the first line 30 and into the nozzle 40. The nozzle 40 and the orifice 41 are located on the bottom of the sump 10 and are, therefore, below the settle slurry fluid level. The sump pump 25 acts in conjunction with the nozzle 40 and orifice 41 to provide movement of the slurry into the second line 35. The slurry is moved to the diaphragm pump 65 through the second line 35. A turbulent partial vacuum is formed at the orifice 41 by the difference between the flow rate of the diaphragm pump 65 upstream of the second line 35 and the continuous flow rate of the first line 30 exiting the sump pump 25. The diaphragm pump 65 acts to provide approximately 10 gallons per minute to the slurry line 70 to move the slurry from the sump tank 10 to the vibrating separator 80.

Figure 3:
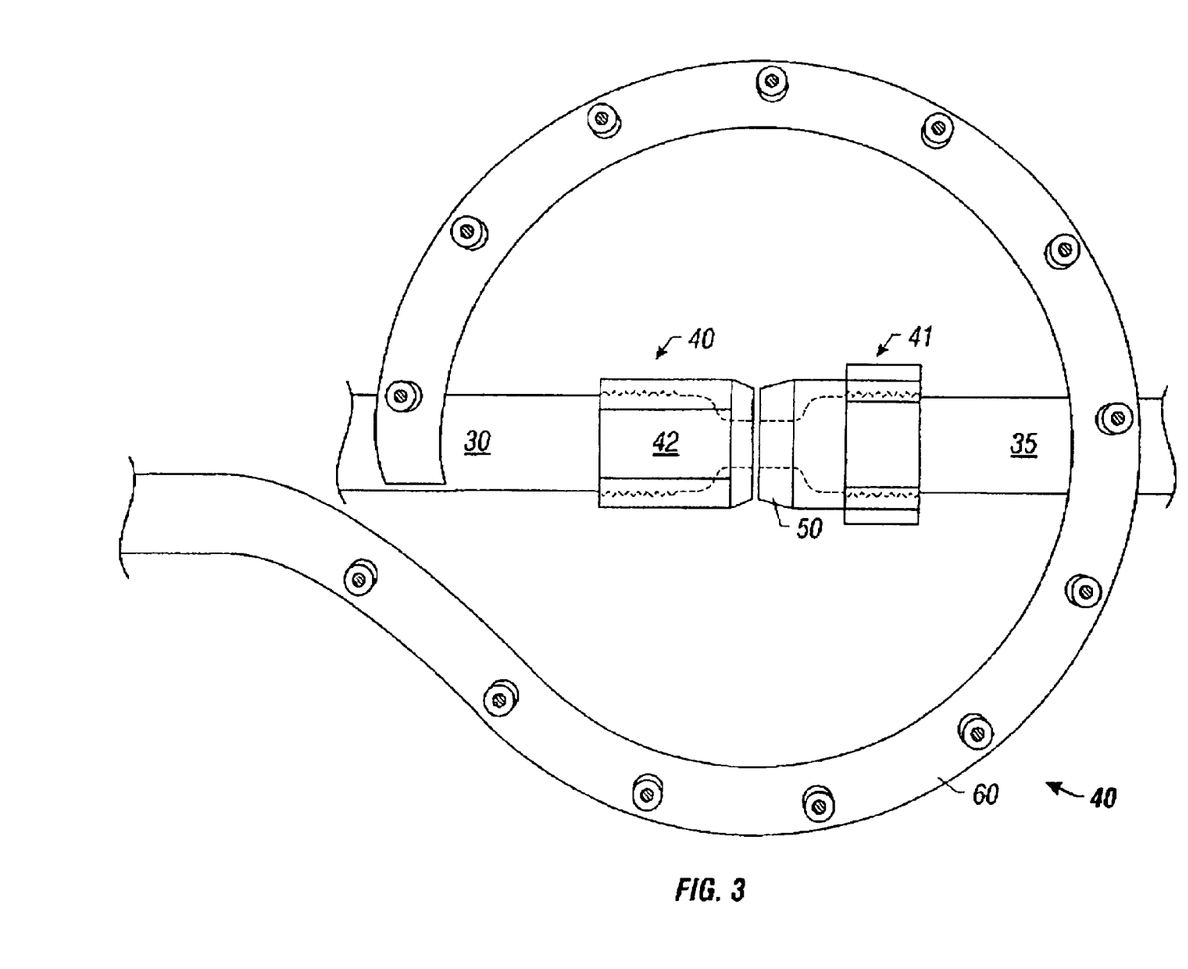
FIG. 3 is a bottom view of a preferred embodiment of the nozzle-orifice arrangement of the slurry intake system.

A preferred embodiment of the nozzle-orifice arrangement is illustrated in FIG. 3. In a preferred embodiment, nozzle 40 is formed by attaching a jetting nipple 42 onto the first line 30. The chamfered end of the nipple 42 is placed adjacent to the orifice which is connected to the second line 35. The chamfered end of the jetting nipple 42 is axially spaced and adjustably affixed adjacent the inlet face 50 of orifice 41 to allow particles approximately three times the maximum abrasive particle size to pass freely into the orifice. The nozzle 40 shown in FIG. 3 is shown in spaced relationship with a preferred embodiment of a pneumatic nozzle 60 further described below.

Figure 4:
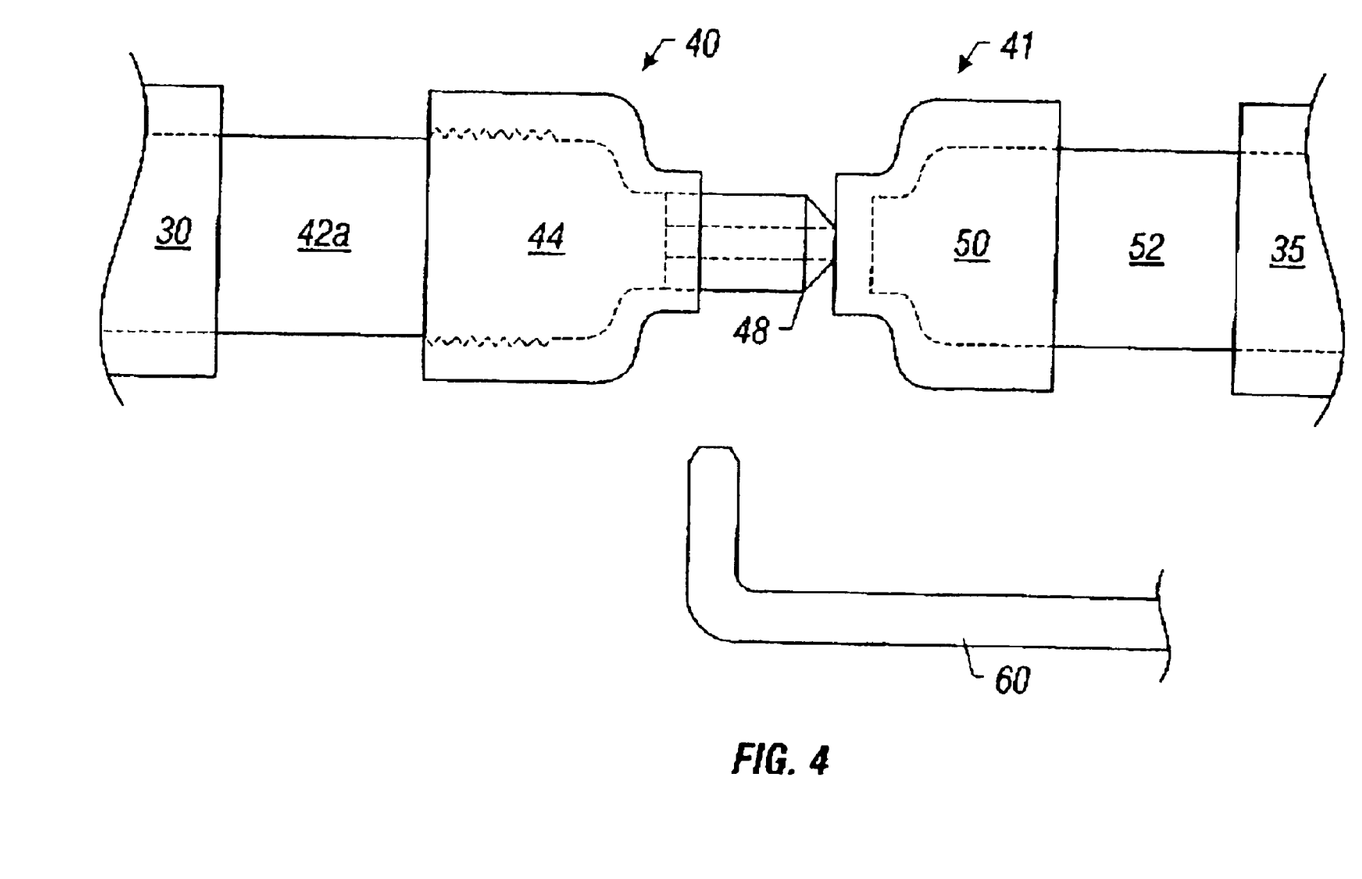
FIG. 4 is a top view of another preferred embodiment of the nozzle-orifice arrangement of the slurry intake system.

Another preferred embodiment of the nozzle 40 and orifice 41 arrangement and another preferred embodiment of a pneumatic nozzle 60 are illustrated in FIG. 4. In this preferred embodiment, the nozzle 40 comprises a jetting nozzle 42a which is formed by inserting a nipple 44 into the first line 30 and connecting thereto a reducer 44 which is connected to a male nipple 48. The chamfered end of the male nipple 48 is placed adjacent to the inlet reducer 50 which is connected to the nipple 52 and thence to the second line 35. As above, the chamfered end of the jetting nozzle 42a is axially spaced and adjustably affixed adjacent the inlet reducer 50 to allow particles approximately three times the maximum abrasive particle size to pass freely into the inlet of reducer 50.

It should be noted that, in addition to the above two preferred embodiments of the nozzle-orifice arrangement, one skilled in the art will recognize there are other nozzle-orifice arrangements which may be substituted to advantage while remaining within the purview of the invention disclosed herein.

Referring to FIGS. 2 and 3, the cooperation between the sump pump 25 and the diaphragm pump 65 may be readily appreciated. The cooperation of the sump pump 25 and the diaphragm pump 65 acts to provide a self-clearing nozzle 40 and orifice 41 arrangement. As is well known to persons having ordinary skill in the art, a diaphragm pump 65 is an intermittent pumping unit composed of an elastomeric element that stops periodically at the top of its pump cycle to reverse direction. The back flow, or perhaps more correctly, the absence of flow, from the diaphragm pump 65 and the continuous incoming slurry from the sump pump 25 through the jetting nipple 42 dislodges particles either too large to pass through the nozzle 40 or which have agglomerated at the opening to the nozzle 40 away from the orifice 41. The turbulence of the slurry in the sump 10 at the nozzle 40 can be adjusted by operator adjustment of pump speed either on the sump pump 25 or the diaphragm pump 65 or is both. Conjunctively, as best shown in FIGS. 3 and 4, the nozzle 40 may be positioned adjacent a pneumatic nozzle 60 which may be periodically actuated during the operation of the apparatus to emit a blast of air away from the nozzle-orifice arrangement to dislodge settled abrasive material from around the vicinity of the nozzle 40 and orifice 41 opening. This is useful to assure the continual flow of particulate matter suspended in the slurry and prevent premature settling.

A pressure drop is maintained at the orifice 41, to move slurry from the sump 10 to the diaphragm pump 65. The diaphragm pump 65 is set to move the slurry at a rate not less than 4.5 feet per second, a rate sufficient to prevent settlement or clogging of the particulate matter in the slurry line 70 which transports the slurry from the sump 10 to the vibrating separator 80.

To balance the flow of slurry through the water jet recycling system 1, the slurry intake system 20 may alternatively be connected to a decanting sump tank (not shown) to provide temporary storage for excess slurry which may be provided, for example, by a multi-jet cutting operation which exceeds the operating flowthrough capacity of the vibrating separator 80 and the fluidized bed dryer 130. This decanting sump would thus allow continuous, balanced operation of the system irrespective of the output of the cutting table.

Additionally, the sump 10 may be serviced by multiple nozzle-orifice arrangements (not shown) placed at various places in the sump 10 to assure pickup of particles distributed throughout the sump tank 10. Each nozzle-orifice arrangement would be selectively activated either manually or by a timed electromechanical valve arrangement controlled through the control circuit in a manner well known to those in the industrial control arts.

Figure 5:
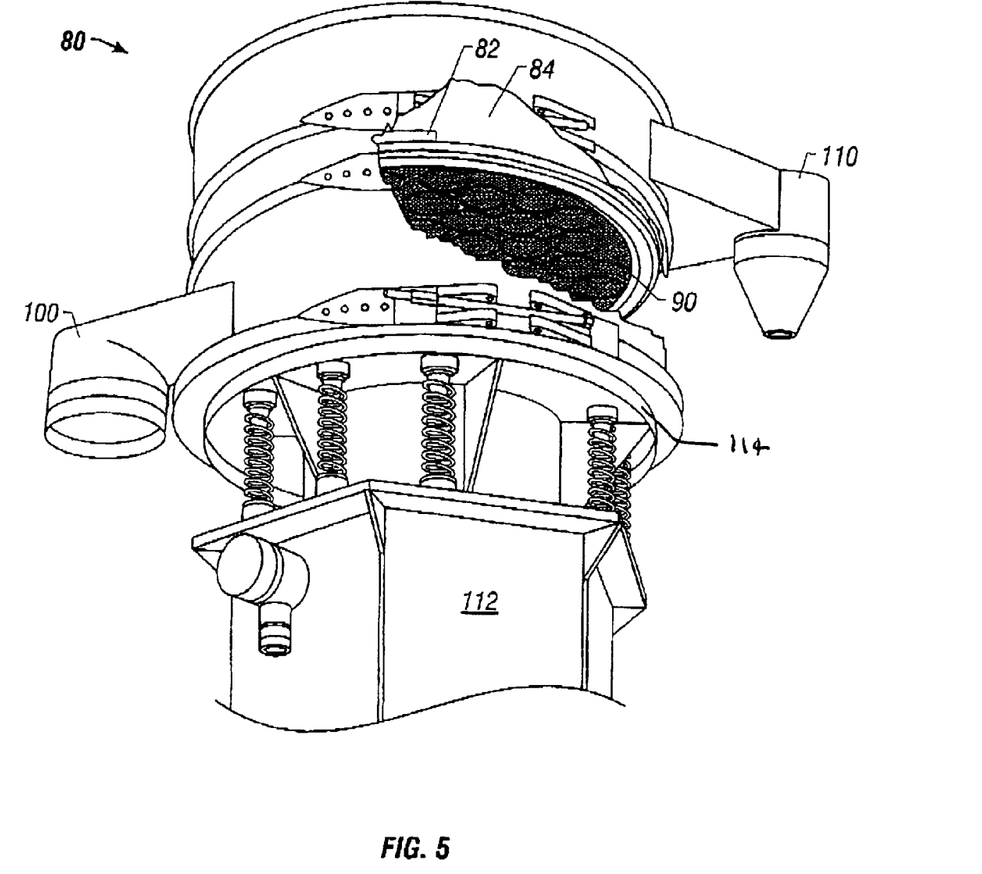
FIG. 5 is a perspective view of a preferred embodiment of the vibrating separator shown with a portion cut away.

FIG. 5 shows the preferred embodiment of the vibrating separator 80 in perspective view with a portion of the vibrating separator 80 cut away to show the shaker filter 90. The vibrating separator 80 is comprised of a distributor 82, an annular space 84, a shaker filter 90, a waste spout 100, a recycle spout 110, a vibrator 112, and a shaker table 114. Slurry from the diaphragm pump 65 is pumped through the slurry line 70 into the distributor 82. The distributor 82 is a shallow pan which receives and distributes the slurry through holes formed in the bottom of the distributor 82 to an annular space 84. The distributor 82 acts to slow the ingress of slurry and allows the incoming slurry to be spread across a substantial area over the shaker filter 90 in the annular space 84 to filter fines which pass through the 100 mesh (Tyler) upper screen of the shaker filter 90.

In a preferred embodiment of the present invention, the upper screen 92 of the shaker filter 90 is fabricated from 100 mesh (Tyler scale) fabric to separate used or spent slurry from larger particles which do not pass through the shaker filter 90. However, one skilled in the art will recognize that depending upon the particular application, other mesh screens can be used to advantage and remain within the purview of the invention.

Figure 6:
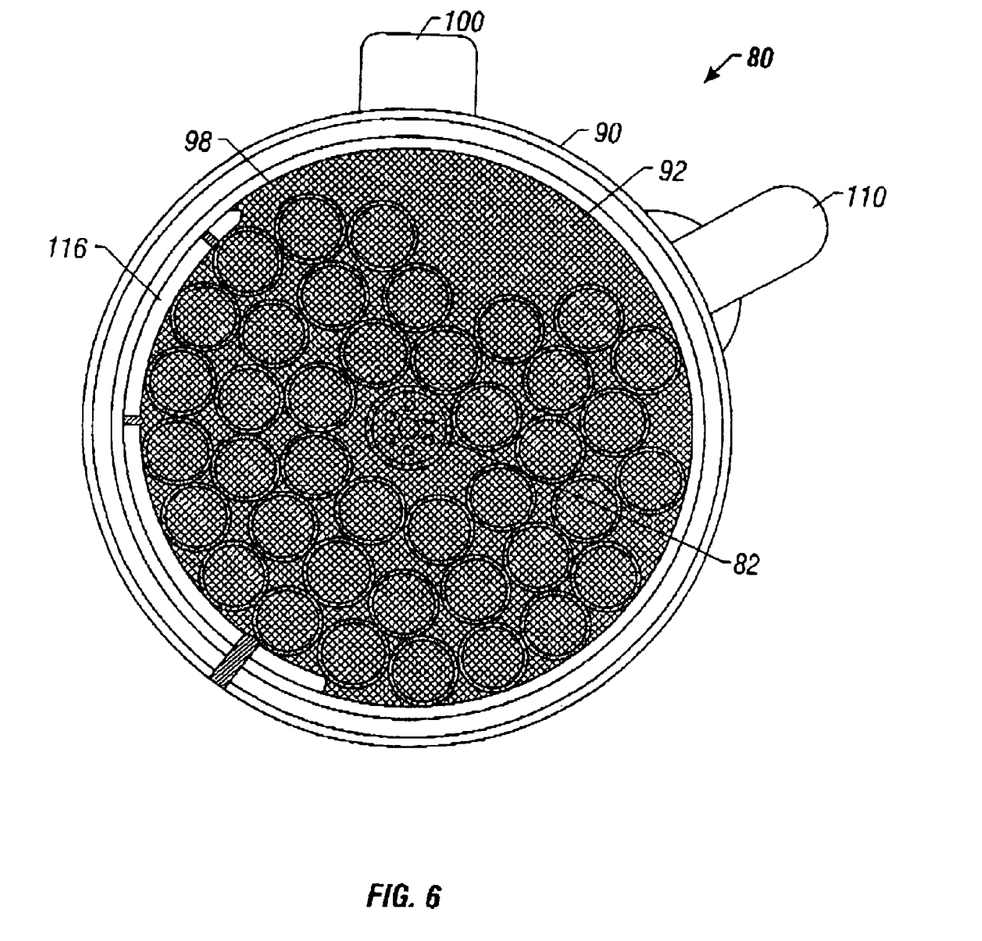
FIG. 6 is a top view of a preferred embodiment of the vibrating separator and filter.
Figure 7:
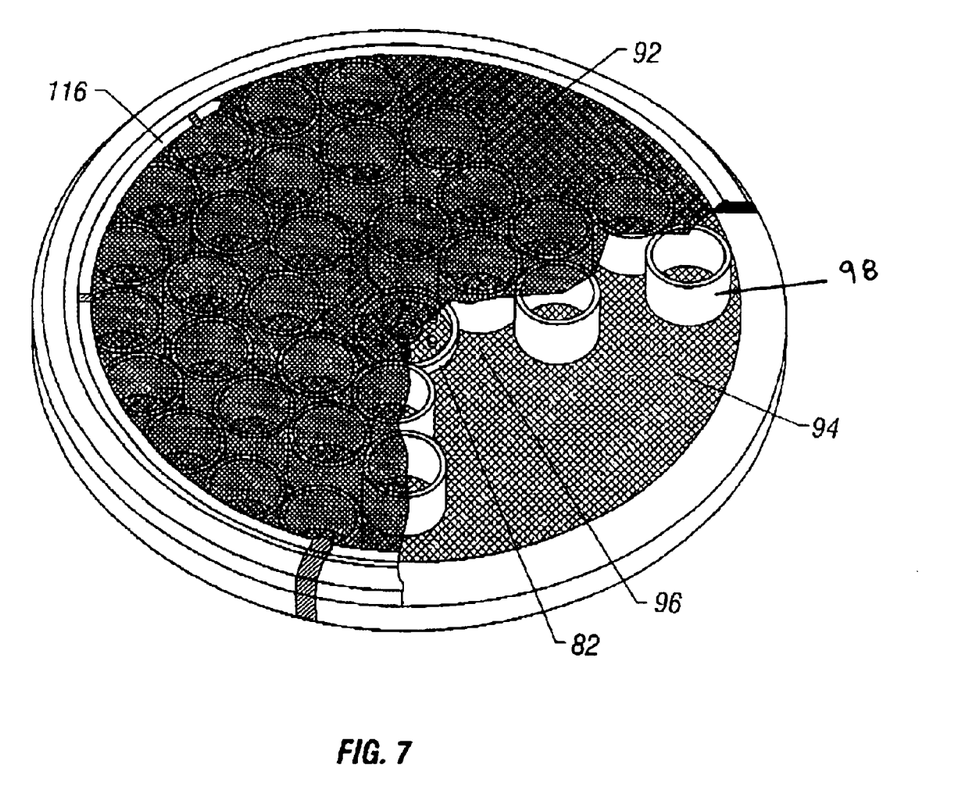
FIG. 7 is a perspective view of a preferred embodiment of the filter with a portion cut away.

The shaker filter 90 is best described with reference to FIGS. 6 and 7. FIG. 6 is a top view of the vibrating separator 80 and shaker filter 90, and FIG. 7 is a perspective view of the shaker filter 90 with a portion of the upper screen 92 cut away. The shaker filter 90 is generally comprised of an upper screen 92 affixed to a lower screen 94 forming a chamber 96 therebetween. The upper screen 92 is fabricated from the desired mesh (Tyler scale) fabric. As discussed above, in a preferred embodiment the upper screen 92 is fabricated from 100 mesh (Tyler scale) fabric. The lower screen 94 is constructed of a coarser or larger mesh to prevent clogging of the already filtered fines and to provide support for the screen brushes 98 in close vertical proximity to the upper screen, as discussed below.

Referring to FIGS. 5–7, after passing the slurry through the shaker filter 90, the smaller fines which pass through the screens 92 and 94 are no longer useable as a cutting grit and are washed out the outlet spout 100 to be discarded. The larger recyclable particles are caught in the annular space 84 and are forced from the annular space 84 out the recycle spout 110 by the action of the vibrator 112 and the shaker table 114.

The vibrator 112 and the shaker table 114 provide a mechanical shaking apparatus commonly used in the industry and well know to those skilled in the art. The operator adjusts the weights of the shaker table 114 to permit a generally circular agitation. The larger particles which do not pass through the shaker filter 90 are moved by the cooperative shaking of the vibrator 112 and the shaker table 114 to the periphery of the shaker filter 90. The garnet particles are slowly moved by the generally circular agitation to the periphery of the annular space 84 and under a water wash pipe 116 which is disposed around a portion of the periphery. The water wash pipe 116 circulates clean water to wash and lubricate the reuseable abrasive which accumulates on the perimeter of the annular space 84 and which is moved by the action of the vibrator 112 and the shaker table 114 to the recycle spout 110.

An additional feature provided by the action of the vibrator 112 and the shaker table 114 is to prevent slurry from clogging the upper screen 92. The larger abrasive particles tend to lodge in the apertures of the upper screen 92 resulting in a loss of screen efficiency. In a preferred embodiment of the present invention the clogging or blinding is prevented by the continuous agitation of the screen brushes 98 located within the chamber 96. The screen brushes 98 are formed from a plurality of polyvinyl chloride rings chained together. Continuous agitation of the screen brushes 98 by the action of the vibrator 112 and the shaker table 114, results in the screen brushes 98 continuously jostling and bumping the upper screen 94 to knock lodged particles loose from the shaker filter 90.

It should be noted that although the shaker filter 90 of a preferred embodiment of the present invention utilizes two affixed screens 92, 94, one skilled in the art will recognize that any number of screens, or even a single screen, can be used to advantage and remain within the purview of the invention. For example, if a single screen 92 is used, the screen brushes 98 reside on top of the screen 92. Just as before, agitation of the screen brushes 98 by the action of the vibrator 112 and shaker table 114 causes the screen brushes 98 to jar particles loose which have become clogged on the screen 92.

As previously noted, reusable garnet fines are moved from the periphery of the annular space 98 and down the recycle spout 110. The sized garnet particles drop into the fluidized bed dryer 130, shown in FIGS. 8 and 9, which are, respectively, perspective and side schematic views of the fluidized bed dryer 130. The fluidized bed dryer 130 dries the reusable garnet particles which are deposited into the final product spout 200 which separates the dried fines from oversize waste, such as wood particles and plastic pieces which may be left from the cutting process. The final product spout 200 facilitates movement of the particles down and across a 40 mesh (Tyler) screen 210 which separates the dried reuseable garnet particles from other scrap and oversize particulate matter remaining after drying. As discussed above with regard to FIG. 1, after the dried reusable garnet particles pass through the 40 mesh (Tyler) screen, they can be mixed with fresh garnet which is inserted into the hopper 190.

Figure 8:
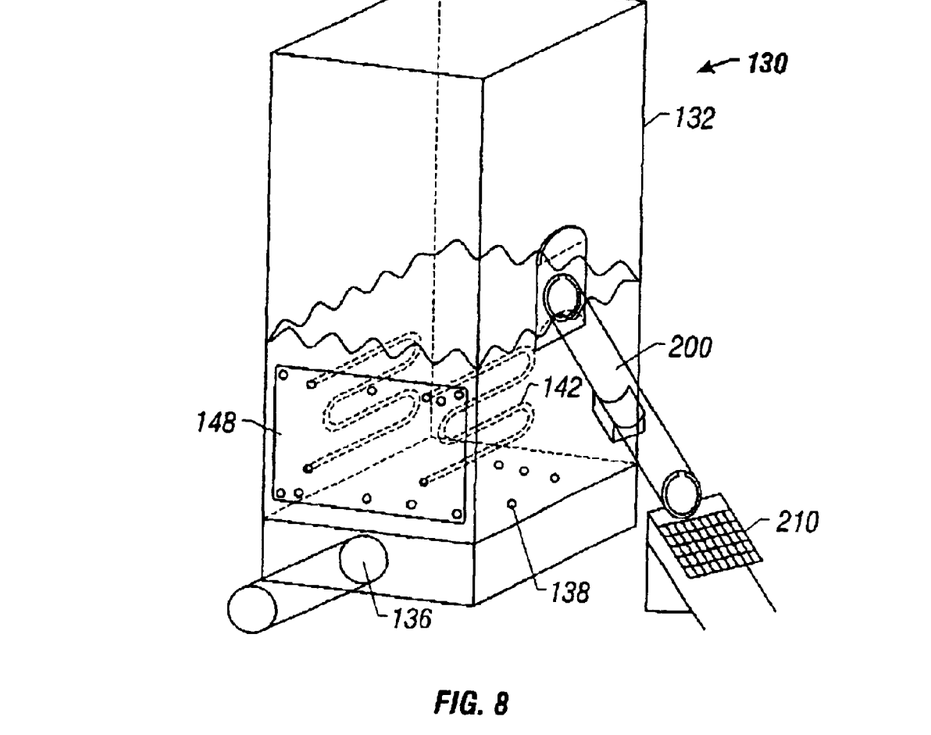
FIG. 8 is a perspective view of a preferred embodiment of the fluidized bed dryer.
Figure 9:
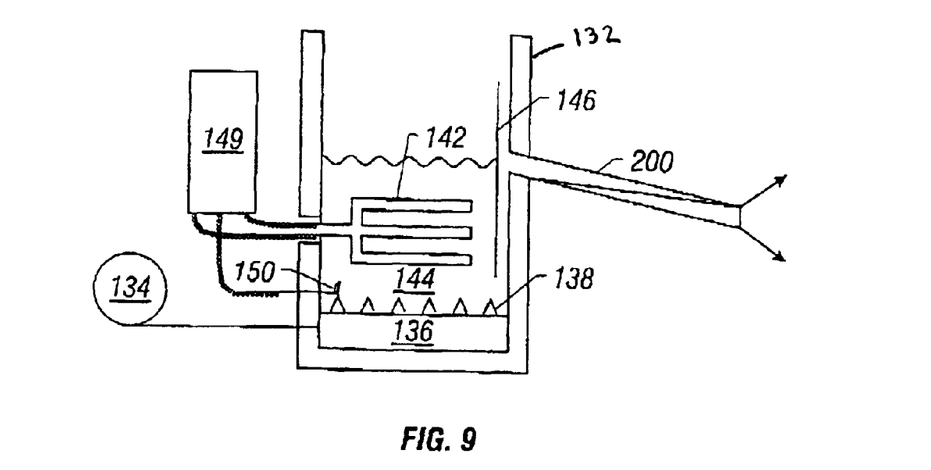
FIG. 9 is a side schematic view of a preferred embodiment of the fluidized bed dryer.

The fluidized bed dryer 130 is formed from an insulated vessel wrapped in refractory wool lagging 132 to maintain a relatively constant temperature inside the vessel and to prevent burning the operator or other personal from casual touching or brushing against the vessel. A fluidized bed of the garnet fines is maintained by a blower 134 which provides approximately 12 cubic feet per minute of air into a plenum 136 and through tuyeres or nozzles 138 to pass such air through the particles received in the drying vessel from the recycle spout 110 (shown in FIG. 5). Drying heat is provided by electrical heating elements 142 mounted on the interior of the fluidized bed dryer 130 and which extend into and are maintained wholly within the fluidized bed 144 of the drying particulate matter. The constant turbulence of the air flow agitates the particulate matter above and around the heating elements, thereby drying the particles. The electric heating elements 142 do not provide open flame and therefore do not emit toxic waste gases. Excessive moisture evaporates out the top of the fluidized bed dryer 130 and the dried garnet exits from the drying chamber through the final product spout 200. The wet particles are prevented from short cycling through the drying chamber by the screen 146 which lengthens the transit path of the wet particles down the fluidized bed dryer 130 before they are allowed to exit through the final product spout 200. The screen 146 is formed by attaching an arcuate plate over the inner surface of the wall of the fluidized bed dryer 130 adjacent the opening to the final product spout 200, extending below the line of the fluidized bed 144 and above the highest bed level. The screen 146 provides in the preferred embodiment about two inches of clearance around the opening of the final product spout 200.

The fluidized dryer shown 130 in FIG. 9, as shown, has its initial charge of garnet sitting without the blower 134 on or the heating elements 142 activated. An initial charge of garnet in the fluidized bed dryer 130 is approximately fifteen inches deep, the top of which is lower than the final product spout 200 when the fluidized bed 144 is cold and the blower 134 is off.

The heating elements 142 are attached to a service panel 148 which is affixed to the fluidized bed dryer 130. The heating elements 142 are controlled by a control circuit 149, as is commonly known in the art, and can be turned on and off by a thermocouple 150 disposed inside the fluidized bed 144. The control circuit 149 acts to activate and de-activate the heating elements based upon data received from the thermocouple 150 or predetermined time intervals, and also provides safety shut downs of the fluidized bed dryer 130. One skilled in the art will recognize that the control circuit 149 can be electronically or computer controlled by means commonly known in the art. The drying process is started by by the control circuitry energizing the blower and heater elements prior to the engagement of the pumps. The fluidized bed reaches an appropriate operating temperature in approximately five minutes.

Drying of garnet is best accomplished by maintaining an temperature of the fluidized bed 144 of approximately 150 degrees C. Further, the heating elements 142 are designed to provide a total of 22.5 KW of power to the bed. In a preferred embodiment, this is accomplished by providing nine rows of heating elements 142 rated at 2.5 KW each. The heating elements 142 are evenly spaced in the fluidized bed 144 approximately one inch from the interior wall of the fluidized bed dryer 130. The heating elements 142 are formed with a 0.450 inch Incoloy (Inco Alloys International Inc.) metal to offer the resistance necessary to achieve the heating required. Activation of the blower 170 forcing air into the plenum 136 and stage controlling the heating elements 142 by the control circuit 149 prevents overheating of the elements 142 and premature burn out of said elements 142.

Figure 10:
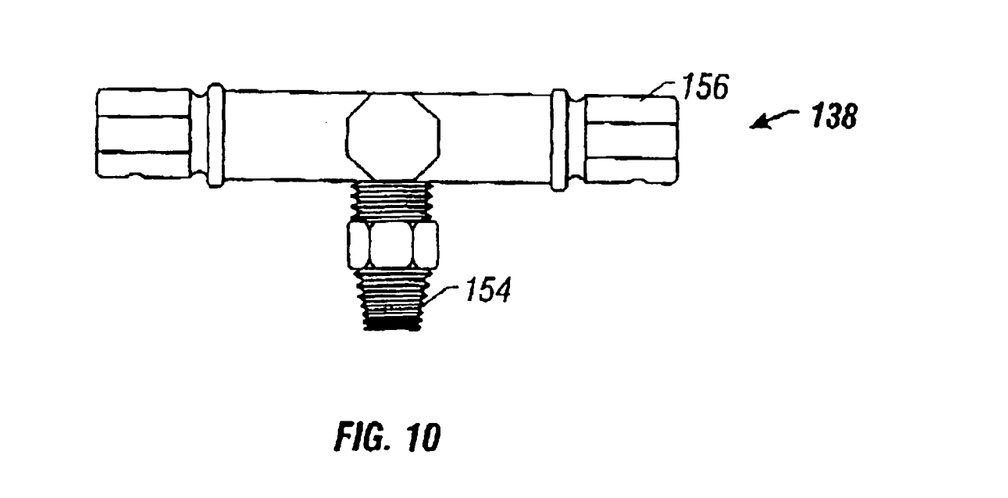
FIG. 10 is a side view of a preferred embodiment of the tuyere of the fluidized bed dryer.
Figure 11:
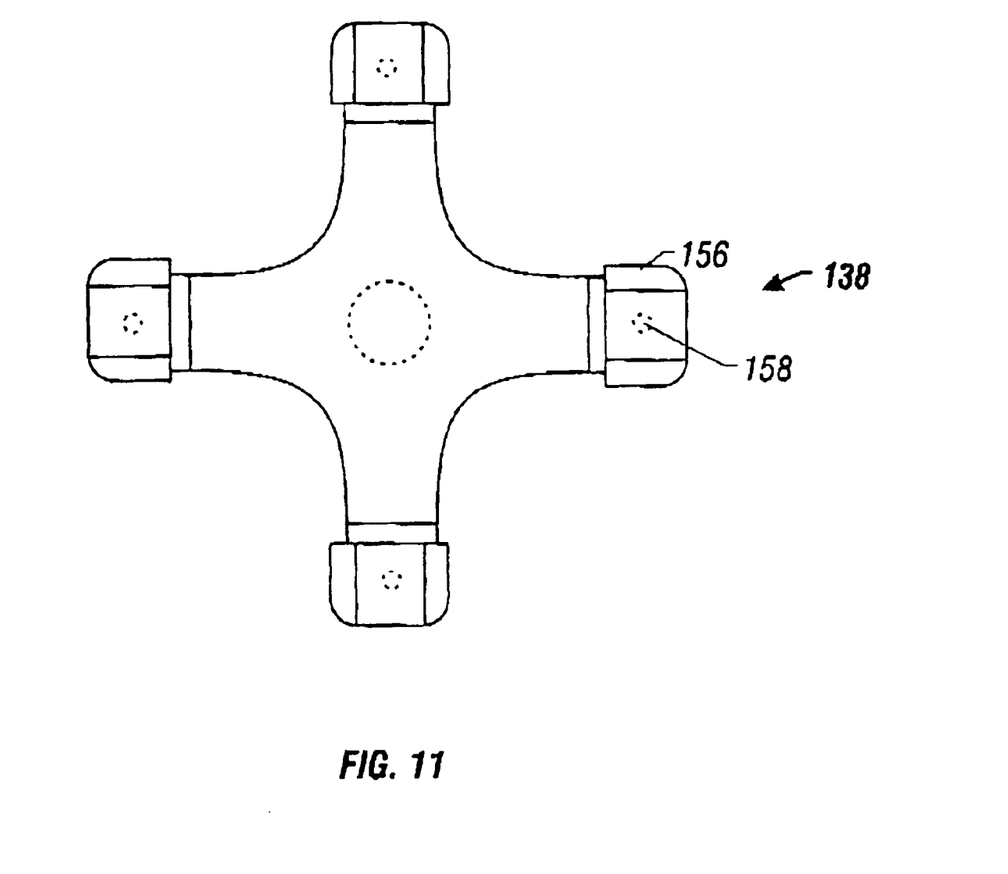
FIG. 11 is a top view of a preferred embodiment of the tuyere of the fluidized bed dryer.

FIGS. 10 and 11 show side and top views, respectively, of a tuyere 138 of a preferred embodiment of the present invention. The tuyeres 138 are shaped to allow in the ingress of air from the plenum 136 (shown in FIGS. 8 and 9), but prevent the egress of the abrasive particles when the source of air is turned off. Each tuyere 138 is fabricated from a bronze cross which has been tapped and fitted with a tuyere nipple 154 which is then connected through the floor of the fluidized bed 144 to the plenum 136 which permits communication of air into the fluidized bed 144. A cap 156 is placed at the distal end of each arm of the cross to close the outlet. Additionally, a hole 158 is drilled into the lower side of each arm to provide the port for the air from the plenum 136 to pass through the tuyere 138 into the fluidized bed 144.

The level of the fluidized bed 144 of garnet particles is self-regulating. The thermocouple 150 constantly measures the temperature of the fluidized bed 144. When the temperature of the fluidized bed 144 exceeds a preset temperature, the controller circuit 149 automatically shuts off the heating elements 142 which slows drying and allows the fluidized bed 144 to become cooler. Equilibrium will be re-established when the excess dried product leaves the fluidized bed dryer 130 and additional wet product enters the fluidized bed dryer 130. The heating elements 142 are then energized when the temperature of the fluidized bed 144 drops below the preset temperature indicating the presence of excess wet particulate matter in the fluidized bed dryer 130. Additionally, the control circuit 149 can be programmed to signal the operator when current through the heating elements 142 drops which may indicate a broken heating element 142.

In yet another application of the present invention, the abrasive recycling apparatus is fitted with a 250 mesh screen which was used to filter the cuttings or kerf from platinum substrates. In this application, 150 mesh grit is used to cut electronic circuit boards and the like which are formed over a platinum substrate. The filter was used to recover recyclable grit and the platinum and non-useable grit passed through spout 100 as a sludge from which, after drying, the user may then recover the platinum by methods well known in the precious metals recovery business. The use of this filter system permits the present invention to selectively remove precious and valuable metals from a sludge as well as removing recyclable grits. By first removing the recyclable grits, which may account for up to fifty percent by weight of the original slurry, the cost of recovery of the precious metals may be dramatically reduced.

Although described in terms of the preferred embodiments shown in the figures, those skilled in the art who have the benefit of this disclosure will recognize that changes can be made to the individual component parts thereof which do not change the manner in which those components function to achieve their intended result. Such changes are intended to fall within the scope of the following non-limiting claims.

What is claimed is:

1. An abrasive recovery apparatus for use in conjunction with the slurry generated by water jet cutting or conditioning operations, the slurry comprised of non-recyclable fines and recyclable particles, the abrasive recovery apparatus comprising:

a slurry intake system for distributing collected slurry, the slurry intake system having a sump pump, a nozzle-orifice arrangement, and a diaphragm pump, the sump pump for passing the water into the nozzle-orifice arrangement for the collection of slurry into the diaphragm pump, the diaphragm pump for forcing the slurry downstream from the sump pump and for intermittently providing back flow through the nozzle-orifice arrangement to dislodge slurry agglomerated at the opening to the nozzle-orifice arrangement;

a vibrating separator downstream from the diaphragm pump for receiving the slurry and separating the non-recyclable fines from the recyclable particles, the vibrating separator having a distributor, a shaker filter, a waste spout, a recycle spout, a vibrator, and a shaker table, the distributor being a shallow pan for receiving and distributing the slurry to the shaker filter, the shaker filter having one or more screens to remove non-recyclable fines from the slurry and pass through the waste spout, the shaker filter further passing the recyclable particles through the recycle spout, the shaker filter further having a plurality of screen brushes to agitate the slurry and prevent clogging upon action by the vibrator and shaker filter; and a fluidized bed dryer comprising a drying chamber, heating elements and a final product spout, the drying chamber for receiving the recyclable particles from the recycle spout, the heating elements for drying the recyclable particles, and the final product spout for delivering dried recycled particles.

2. The abrasive recovery apparatus of claim 1, further comprising a thermocouple disposed within the fluidized bed dryer to control the activation of the fluidized bed dryer.

3. The abrasive recovery apparatus of claim 1 further comprising a control circuit for selectively energizing the heating elements.

* * * * *